J. E. BARNETT.
DIRIGIBLE HEADLIGHT.
APPLICATION FILED DEC. 22, 1915.
1,194,123.  Patented Aug. 8, 1916.
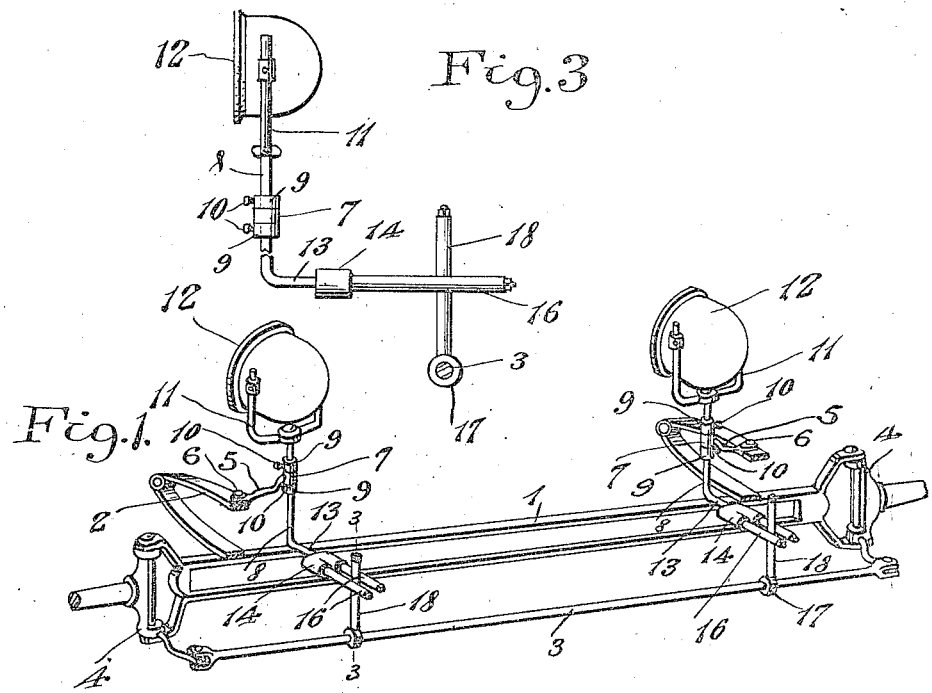
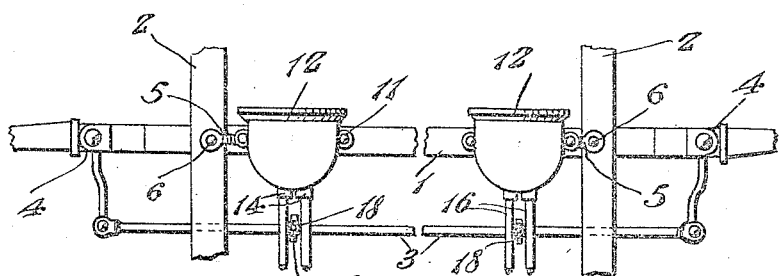
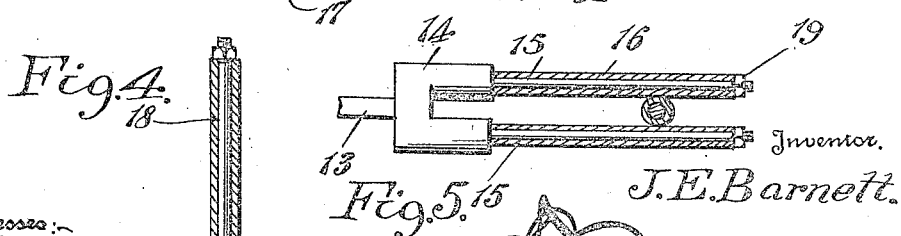
Inventor.
J. E. Barnett.

UNITED STATES PATENT OFFICE.

JOSEPH E. BARNETT, OF PRENTISS, MISSISSIPPI.

DIRIGIBLE HEADLIGHT.

1,194,123.

Specification of Letters Patent.

Patented Aug. 8, 1916.

Application filed December 22, 1915. Serial No. 68,247.

*To all whom it may concern:*

Be it known that I, JOSEPH E. BARNETT, a citizen of the United States, residing at Prentiss, in the county of Jefferson Davis and State of Mississippi, have invented certain new and useful Improvements in Dirigible Headlights; and I do hereby declare the following to be a full, clear, and exact description of the invention, such as will enable others skilled in the art to which it appertains to make and use the same.

This invention relates to new and useful improvements in a dirigible headlight and its preliminary object is to provide an extremely simple and practical dirigible or automatic headlight for vehicles, which will be turned with the movement of the front wheels of a vehicle or automobile, so as to throw its rays always in the path of the vehicle.

Another object of this invention is the provision of novel means of connecting the lamp standard to the connecting rod of an automobile, so that said lamp standard which is carried by the springs of a vehicle may move upwardly and downwardly in respect to the movement of the connecting rod, when the automobile passes over uneven ground.

A further and more specific object of this invention, is the provision of friction sleeves journaled upon the relative spaced arms which are secured to the lamp standard and the friction sleeve journaled on the vertical operating arm that is carried by the connecting rod of an automobile to facilitate easy movement of the lamp standard when the connecting rod is shifted in either direction and to compensate for the friction occurring between the vertical arm and the spaced arms.

With these and other objects in view as will become more apparent as the description proceeds, the invention consists in such novel features of construction, combination and arrangement of parts as will be hereinafter more fully described and claimed.

For a complete understanding of my invention, reference is to be had to the following description and accompanying drawing, in which:—

Figure 1 is a rear elevation of a front axle of an automobile, equipped with my improved headlight. Fig. 2 is a top plan view illustrating the connection between the lamp standard and the connecting rod of an automobile to allow for the upward and downward movement of a lamp standard in respect to the movement of the front axle. Fig. 3 is a side elevation, illustrating the lamp standard and connecting rod removed from an automobile, Fig. 4 is a vertical sectional view of the operating arms, taken on the line 3—3 of Fig. 1 and, Fig. 5 is a horizontal detail sectional view, illustrating the forked arms or relative spaced arms of the lamp standard receiving the vertical operating arm therebetween.

Referring in detail to the drawing by numerals 1 designates the front axle of an automobile having springs 2 secured thereto and a connecting rod 3 for moving the stub axles 4 in unison to each other, by means of a steering mechanism (not shown). Secured to the spring 3 is a bracket 5 by means of a bolt 6 or other suitable means, and the bracket 5 is provided with an enlarged portion 7 at the end thereof having a central bore to rotatably receive a lamp standard 8. The lamp standard 8 is held within the bracket 5 by means of upper and lower collars 9 which are secured to the lamp standard 8 by set screws 10, providing means whereby the collars 9 may be adjusted upwardly and downwardly upon the lamp standard 8 to compensate for the wear occurring between the lamp standard 8 and the bracket 5 and further preventing any unnecessary rattling.

Secured to the upper end of the lamp standard 8 is a suitable forked arm 11 to receive a headlight 12 of any desired type.

The lamp standard 8 is bent rearwardly intermediate its end and overlies the front axle to provide an operating rod 13 having secured to its free end a substantially U-shaped number 14. A pair of spaced arms 15 are secured to the U-shaped number 14 and have journaled thereon friction sleeves 16. Mounted upon the connecting rod 3 is a vertically extending operating arm 17, having a friction sleeve 18 journaled thereon, to be received between the spaced arms 15, providing means whereby the lamp standards 8 may be moved in the opposite direction from the movement of the connecting rod 3 and will allow for the upward and downward movement of the lamp standards in relation to the front axle 1, when the automobile is passing over uneven ground. The friction sleeves 16 and 18 are held upon the spaced arms 15 and the vertical operating arm 17 by nuts 19 threaded to the ends thereof.

From the foregoing description taken in connection with the accompanying drawings, it will be seen that when the connecting rod 3 is shifted to the left by a steering mechanism (not shown) to turn the vehicle to the right, the lamp standard 8 will be rotated in the same direction and thus the rays of light from the lamp will be directed in the path of the vehicle at all times.

While I have shown and described a preferred embodiment of my invention, it will be understood that minor changes in construction, combination and arrangement of parts may be made without departing from the spirit and scope of my invention as claimed.

Having thus described my invention what I claim is:—

1. A dirigible headlight comprising a bracket, a lamp standard rotatably mounted in said bracket, means for preventing upward and downward movement of the lamp standard within said bracket, a headlight carried by said lamp standard, said lamp standard bent at right angles intermediate its ends to provide an operating rod, a substantially U-shaped member secured to the free end of said operating rod, and means for connecting said U-shaped member to a connecting rod of an automobile for rotating said lamp standard in the direction of the wheels of an automobile and to allow for upward and downward movement of the lamp standard with respect to the connecting rod.

2. A dirigible headlight comprising a bracket secured to the springs of an automobile, an enlarged portion formed on the end of said bracket and provided with a central bore, a lamp standard journaled in said bore, collars adjustably secured on said lamp standard and adapted to bear upon each end of the enlarged portion to prevent upward and downward movement of the lamp standard within said bore, an operating rod formed on said lamp standard and extending rearwardly above the front axle of an automobile, a headlight carried by the upper end of said lamp standard, a substantially U-shaped member secured to the end of the operating rod, a pair of spaced arms secured to said U-shaped member, a vertically extending operating arm secured to a connecting rod of an automobile and extending between said spaced arms to move the headlight according to the movement of the vehicle.

3. A dirigible headlight comprising a bracket secured to a spring of an automobile, a lamp standard journaled in said bracket, a headlight carried by the upper end of said lamp standard, an operating rod formed on the lower end of said lamp standard and extending at right angles therefrom, a substantially U-shaped member secured to the free end of said operating rod, a pair of spaced arms secured to said U-shaped member, friction sleeves journaled on said arms, a vertically extending operating arm secured to the connecting rod of an automobile and provided with a friction sleeve journaled thereon to be received between the spaced arms to facilitate the movement of the headlight in the direction of the front wheels of an automobile.

In testimony whereof I affix my signature in presence of two witnesses.

JOSEPH E. BARNETT.

Witnesses:
ANNIE STEEN BARNETT,
LOUISE BARNETT.